United States Patent
Krengel et al.

(10) Patent No.: US 7,373,924 B1
(45) Date of Patent: May 20, 2008

(54) METHOD AND SYSTEM TO MITIGATE PUMP NOISE IN A DIRECT INJECTION, SPARK IGNITION ENGINE

(75) Inventors: Eric Krengel, Dearborn, MI (US); Mansour Beshay, Ann Arbor, MI (US); Deanna Hoffman, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/746,972

(22) Filed: May 10, 2007

(51) Int. Cl.
*F02M 69/54* (2006.01)
*F02M 69/52* (2006.01)

(52) U.S. Cl. ..................... 123/457; 123/499

(58) Field of Classification Search ................ 123/457, 123/501, 500, 495, 509, 499, 456, 447, 446; 417/279, 307, 308, 309; 251/129.01, 129.02, 251/129.15
See application file for complete search history.

(56) References Cited

U.S. PATENT DOCUMENTS

| | | | |
|---|---|---|---|
| 5,538,403 A * | 7/1996 | Black | 417/253 |
| 6,016,791 A * | 1/2000 | Thomas et al. | 123/497 |
| 6,205,978 B1 | 3/2001 | Zoeller | |
| 6,318,343 B1 * | 11/2001 | Nakagawa et al. | 123/500 |
| 6,578,553 B1 | 6/2003 | Schubert et al. | |
| 6,712,037 B2 | 3/2004 | Xu | |
| 6,761,152 B1 | 7/2004 | Elmslie et al. | |
| 6,843,053 B2 * | 1/2005 | Draper et al. | 60/274 |
| 7,028,667 B2 * | 4/2006 | Hori | 123/446 |
| 7,143,746 B2 * | 12/2006 | Knight et al. | 123/447 |
| 7,168,637 B2 | 1/2007 | Goenka et al. | |
| 7,191,762 B2 * | 3/2007 | Yudanov | 123/446 |
| 7,198,033 B2 | 4/2007 | Inaguma et al. | |
| 2002/0129792 A1 * | 9/2002 | Rodriguez-Amaya et al. | 123/446 |
| 2004/0025846 A1 * | 2/2004 | Draper et al. | 123/447 |
| 2005/0000493 A1 * | 1/2005 | Yudanov | 123/446 |
| 2005/0257772 A1 | 11/2005 | Asiello et al. | |
| 2006/0147317 A1 * | 7/2006 | Okamoto et al. | 417/297 |
| 2006/0157030 A1 * | 7/2006 | Knight et al. | 123/447 |

* cited by examiner

*Primary Examiner*—Mahmoud Gimie
(74) *Attorney, Agent, or Firm*—Diana D. Brehob

(57) ABSTRACT

A method and system for controlling a fuel pressurizing system in a direct-injection, spark-ignition engine is disclosed such that the ticking sound of a solenoid valve in the high pressure pump is disabled at certain engine operating conditions. The fuel pressurizing system includes two pumps in series: a low pressure lift pump and a high pressure pump. Based on an engine operating parameter (speed, load, temperature, fuel delivery rate, as examples) the high pressure fuel pump is disabled when the engine operating parameter is below a threshold. The disablement of the pump is accomplished by turning off the normally-open solenoid valve on the inlet side of the high pressure pump, particularly at low speed and/or low torque conditions, e.g., idle, when the ticking of the injector is particularly noticeable. When the pump is disabled, fuel is supplied to the fuel injectors at lift pump pressure.

29 Claims, 3 Drawing Sheets

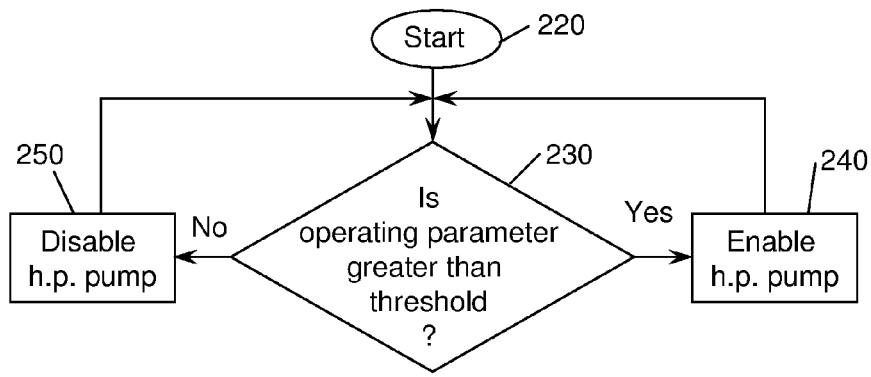
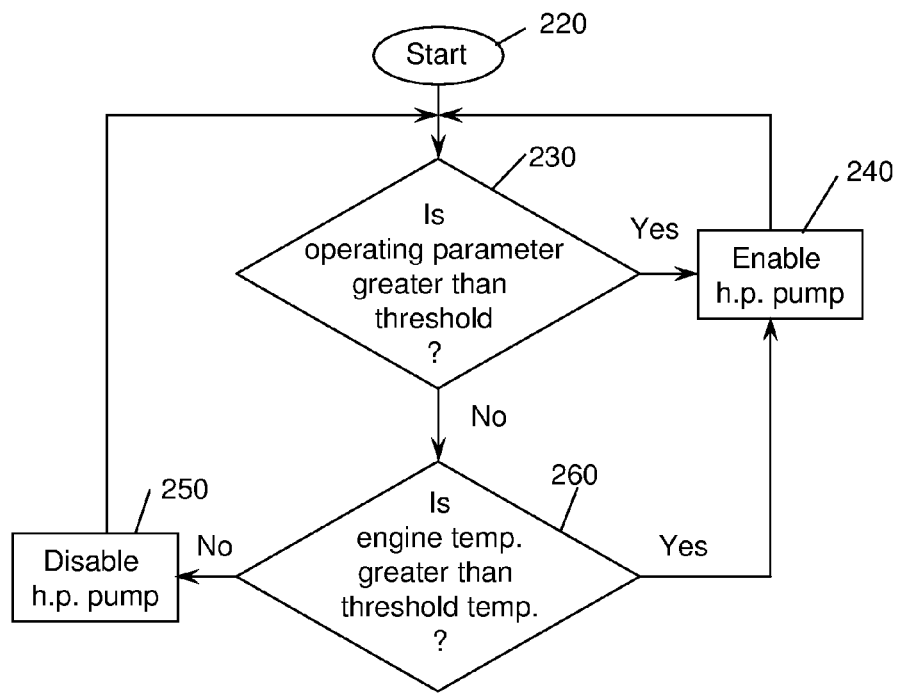

METHOD AND SYSTEM TO MITIGATE PUMP NOISE IN A DIRECT INJECTION, SPARK IGNITION ENGINE

FIELD OF THE INVENTION

A method and system for controlling a fuel pressurizing system in a direct-injection, spark-ignition engine is disclosed. The fuel pressurizing system includes two pumps in series: a low pressure lift pump and a high pressure pump.

BACKGROUND

Direct-injection, spark-ignition engines typically operate with injection pressures up to 150 bar. To obtain such a high pressure, it is common to employ two pumps in series: a low pressure, electrically-operated pump bringing the pressure to 3 to 7 bar feeding a high pressure pump. The high pressure pump can be electrically, hydraulically, or mechanically operated. Mechanical pumps tend to predominate as they are more efficient than electric pumps and less complex than hydraulic pumps. To provide variable control of a mechanical pump, it is known to install a solenoid valve in the pump which can be opened and closed during the pump plunger's travel. When the solenoid valve is open, the pump plunger merely pumps the fuel back to the inlet side of the pump. When the solenoid valve is closed, the pump's plunger causes the fuel to be pumped into the outlet side at high pressure. By controlling the solenoid valve based on the plunger position, the amount of fuel and pressure of the fuel delivered can be tailored to the demand of the engine.

The solenoid valve makes a clicking sound during each actuation. During normal driving, the clicking is not noticeable in relation to road, wind, and engine noise. However, at idle, when the engine is at its quietest and there is no road and limited wind noise, the clicking noise is noticeable and can be a source of customer concern or dissatisfaction. Thus, it is desirable to overcome that noise.

The inventors of U.S. Pat. No. 7,198,033 show one such solution. They teach closing the solenoid valve when the engine speed is low. By keeping the solenoid in the closed position, the stroke of the plunger in the high pressure pump is allowed to displace fuel into the high pressure line for the full extent of its stroke. This is in contrast to other operating modes in the solenoid is opened for at least a portion of the plunger stroke, thereby discontinuing the pump plunger's pumping ability while the solenoid if open. Because the engine demands a lower amount of fuel than the pump supplies at an idle condition, the inventors of '033 provide a pressure relief valve and a return line downstream of the engine. If such a return line were not provided, the pressure in the line would continue to rise. Eventually, the pump, fitting, or other fuel system component would fail, if such a return line were not provided.

The inventors of the present invention recognize that it is desirable to avoid having to provide such a fuel return line and pressure relief valve for the engine. Furthermore, the inventors recognize that the approach taken in '033 leads to excessive fuel heating. That is, by holding the solenoid valve in the closed position, the pump pressurizes and delivers a full stroke's worth of fuel. The amount not consumed by the engine is returned to the fuel tank at low pressure, which fuel is heated when the pressure is dropped and due to the fuel being in close proximity to the engine while being circulated.

SUMMARY OF THE INVENTION

Disadvantages of the prior solution is overcome by a fuel supply system and method for an internal combustion engine having a fuel tank, a low pressure pump disposed in said fuel tank, and a high pressure pump located downstream of said low pressure pump. An engine controller is connected to the high pressure pump which disables operation of the high pressure pump when an engine operating condition is in a first range. The operating condition is one or more of engine speed, engine temperature, engine torque, and engine coolant temperature.

In one embodiment, the high pressure pump is a variable pressure pump when the pump pressure demanded by an electronic control unit coupled to the high pressure pump is lower than a threshold pressure, the high pressure pump is disabled.

In one embodiment, the high pressure pump is coupled to a normally-open solenoid valve. An engine controller coupled to the solenoid valve disable the solenoid valve based on an indication of a present engine operating condition being in a first range in regards to one or more of: engine speed, engine torque, fuel delivery rate, and engine temperature. When the operating condition is no longer in the first range, the solenoid valve is enabled.

A method to control a fuel supply system for an internal combustion engine is also disclosed in which the solenoid valve disposed in the high pressure pump is actuated once per pump plunger stroke in response to a first set of engine operating conditions. However, in response to a second set of engine operating conditions, the solenoid valve is maintained in an open position. The high pressure pump has a pump plunger disposed in a cylinder, said cylinder having an inlet port, an outlet port, and a pressure relief port, said pressure relief port being controlled by said solenoid valve, which is a normally-open solenoid valve, said pressure relief port coupled to an inlet side of the pump.

An advantage of the present invention is that by turning off the solenoid valve, the undesirable noise of the solenoid valve actuation, during engine idle, is overcome. Additionally, at low-torque engine operating conditions, at which conditions the electronic control unit demands a low quantity of fuel, when operating at high pressure, the fuel injectors are commanded to open for a short duration to provide such low quantity of fuel. The accuracy at which the injectors can provide high pressure fuel is less than desired. But, when operating at low pressure, the increased injector pulse width allows improved metering accuracy of the fuel injectors. Not only is combustion stability improved by increased accuracy in the in-cylinder air-fuel ratio, but also the emissions from the engine are reduced and the exhaust catalyst efficiency is improved.

In an alternative embodiment, a return line from the fuel rail to the tank is provided. Although the cost advantage of avoiding a return line and pressure regulator is not achieved in such embodiment, the inventive system remains advantageous over that disclosed in '033. In '033, a fuel pump displacement's worth of fuel is raised to high pressure and then depressurized at the fuel regulator on the downstream side of the fuel rail, which causes fuel heating. In the present invention, fuel is supplied at low pressure to the fuel rail. Thus, any fuel returned to the fuel tank does not undergo depressurization and the concomitant heating.

In U.S. Pat. No. 6,712,037, direct injection of fuel at a moderate pressure, about 20 bar is disclosed. The inventors of the present invention have recognized that at certain engine operating conditions, such as at low torque and low speed, fuel at a lower pressure, 3 to 7 bar, can be directly injected into cylinders. The inventors of the present invention have also recognized that high pressure injection, up to 200 bar, can be used at other operating conditions in which lower pressure injection is unsatisfactory due to, for example, insufficient atomization of the fuel or insufficient time to inject the fuel.

BRIEF DESCRIPTION OF THE DRAWINGS

The advantages described herein will be more fully understood by reading an example of an embodiment in which the invention is used to advantage, referred to herein as the Detailed Description, with reference to the drawings wherein:

FIGS. 3a-b show flowcharts of operation of the high pressure fuel pump; and

DETAILED DESCRIPTION

Figure 1:
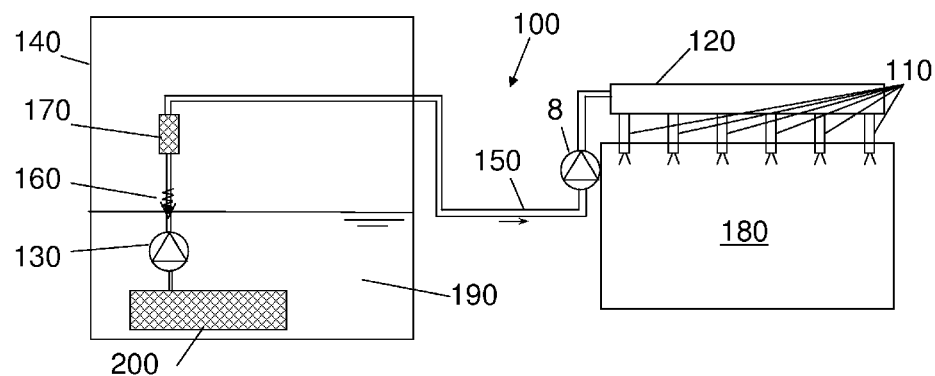
FIG. 1 shows a schematic of a direct-injection engine fuel system with two fuel pumps in series, a low pressure lift pump followed by a high pressure pump.

A schematic of a high pressure fuel system 100 for a direct injection engine is shown in FIG. 1. A low pressure fuel pump 130 is disposed in a fuel tank 140. Fuel 190 passes through filter 200 prior to entering pump 130. A check valve 160 is disposed in the fuel line prior to filter 170. Low pressure fuel line 150 supplies fuel to high pressure pump 8. In one embodiment, high pressure pump 8 is driven off engine 180. Alternatively, pump 8 is driven by an electric motor. High pressure pump 8 supplies fuel to fuel rail 120 which is connected to high pressure fuel injectors 110. Injectors 100 spray fuel directly into engine cylinders within engine 180.

Figure 2A:
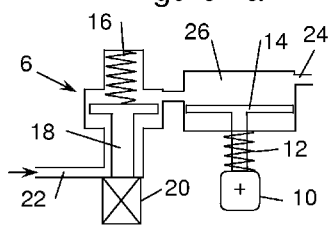
FIGS. 2a-c show a schematic of the high pressure fuel injection pump at several phases of operation.
Figure 2B:
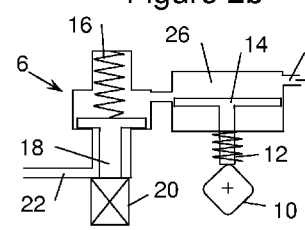
Figure 2C:
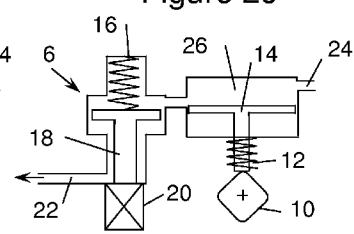

High pressure pump 8, in FIGS. 2a-2c, has an inlet 22 from the low pressure pump and an outlet 24 that feeds the high pressure fuel rail. The fuel inlet is controlled by a solenoid valve 6, which has an armature 18, a coil 20, and a spring 16. In FIGS. 2a and 2c, solenoid valve 6 is shown in its normally open position. In FIG. 2b, solenoid valve 6 is activated, closing off inlet 22 from the high pressure pump 8. High pressure pump contains a plunger or piston 14, which is caused to reciprocate by a cam lobe 10. Cam 10 has four lobes causing there to be four pump strokes per revolution of the camshaft (not shown) to which cam 10 is coupled. The number of lobes on cam 10 is exemplary and not intended to be limiting.

In FIG. 2a, pump plunger 14 is shown in its lowest position, i.e., if cam 10 were rotating, this position is as the pump plunger descends to its lowest point. Also in FIG. 2a, solenoid valve 6 is in the normally open position allowing the descending pump plunger 14 to cause fuel to enter cylinder 26 above pump plunger 14 through inlet 22.

In normal operation, cam 10 continues to rotate, with pump plunger 14 being in its highest position due to cam 10 contacting pump plunger 14 with one the cam tips, as shown in FIG. 2b. Because solenoid 6 is activated, as shown in FIG. 2b, armature 18 causes the solenoid to be closed, that is, the cylinder 26 is closed off from inlet 22 by virtue of the position of armature 18. Thus, the upward movement of pump plunger 14 causes fuel to be pressurized and to exit high pressure pump 26 through outlet 24.

If solenoid valve 6 is maintained in the normally open position, the fuel enters cylinder 26 above pump plunger 14, as discussed above in regard to FIG. 2a. However, when pump plunger 14 rises with solenoid valve 18 in the normally open position, as shown in FIG. 2c, the fuel that was drawn into cylinder 26 is pump back out through inlet 22. Thus, when solenoid valve 6 stays open, the movement of plunger 14 causes fuel to enter and then to exit through inlet 22, with fuel pressure within pump 8 and fuel rail (120 of FIG. 1) at the low pressure provided by pump 130 (shown in FIG. 1). Fuel injectors 110 supply fuel to engine 180, but at lift pump 130 pressure, not at high pressure when high pressure pump 8 is operating normally.

A flowchart according to the present invention is shown in FIG. 3a. After starting 220, the operating parameter upon which the decision to operate the high pressure pump is made is evaluated in block 230. The operating parameter is one or more of engine speed, engine torque, engine temperature, pump pressure, and fuel delivery rate. When the operating parameter exceeds a threshold, the high pressure pump is enabled 240. If not, the high pressure is disabled 250.

The inventors of the present invention have recognized that even if the operating parameter is greater than the threshold, there are situations in which the high pressure pump should not be enabled. In particular, when engine temperature is higher than a threshold temperature, the fuel is also at a high temperature. If the high pressure pump is disabled when the fuel is hot, the fuel may vaporize and cause vapor lock. However, when the fuel is maintained at high pressure, the fuel does not vaporize. Thus, according to an alternative embodiment shown in FIG. 3b, an additional check is made in block 260 in which the high pressure pump is disabled only when the temperature is lower than the threshold temperature.

Figure 4A:
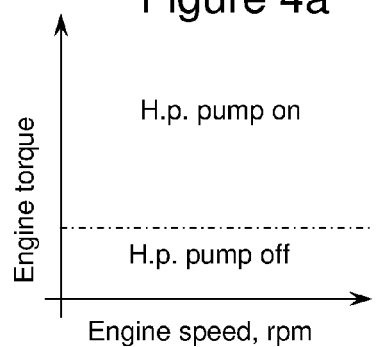
FIGS. 4a-e show engine maps of where the pump is enable/disabled as example embodiments of the present invention.
Figure 4B:
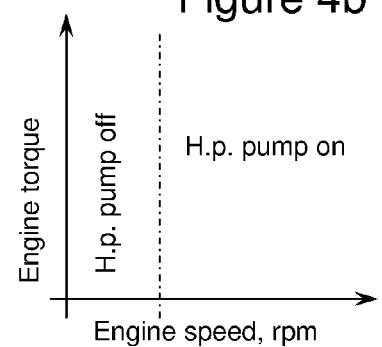
Figure 4C:
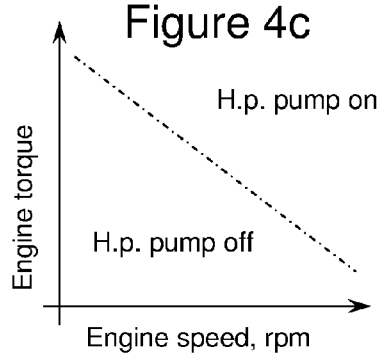
Figure 4D:
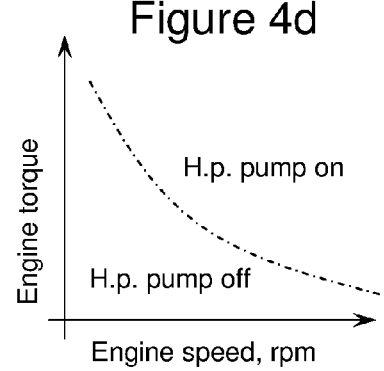
Figure 4E:
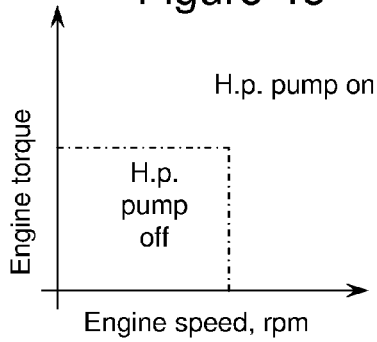

In FIGS. 4a-4e, example embodiments of the present invention are shown. An engine parameter on which the decision to operate the pump is based is engine torque (FIG. 4a). When the engine is operating at low torque, the engine requires a small amount of fuel and thus the pulse width is short. Thus, there is sufficient time for the fuel to be sprayed, even at low pressure. At low torque, the high pressure pump can be turned off. Thus, at idle and low torque conditions, the solenoid valve does not cause a disagreeable ticking noise. In FIG. 4b, the engine parameter is engine speed. At low speed, there is time for the fuel injection event even at low pressure. In FIGS. 4c-e, a combination of engine speed and torque is used as the engine parameter to determine when to turn the pump off or on. In FIG. 4d, the dash-dot line indicates constant fuel delivery rate. Thus, in the upper right, the fuel delivery rate is such that the high pressure pump is turn on. Thus, when the fuel delivery rate is below a threshold, the high pressure pump is disabled.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A fuel supply system for an internal combustion engine, comprising:
   a fuel tank;
   a low pressure pump disposed in said fuel tank;

a high pressure pump located downstream of said low pressure pump;

a normally-open solenoid valve disposed between an outlet of said low pressure pump and an inlet to said high pressure pump; and an engine controller connected to said solenoid valve, said engine controller maintaining said normally-open solenoid valve in its normally-open position for at least one pump cycle.

2. The fuel supply system of claim 1 wherein said high pressure pump is a variable pressure pump, said engine controller requests a desired pressure from said high pressure pump, and said indication causing said disablement of said high pressure pump is based on said desired pressure being lower than a threshold pressure.

3. The fuel supply system of claim 1 wherein said indication is based on engine speed being below an engine speed threshold and engine torque being below an engine torque threshold.

4. The fuel supply system of claim 3 wherein said indication is further based on engine temperature being greater than a low temperature threshold.

5. The fuel supply system of claim 4 wherein said engine temperature is based at least one of coolant temperature, oil temperature, a model of engine temperature, ambient temperature, vehicle speed, and engine operating conditions.

6. The fuel supply system of claim 3 wherein said indication is further based on engine temperature being less than a high temperature threshold.

7. The fuel supply system of claim 1 wherein said indication is based on low torque demand on the engine.

8. The fuel supply system of claim 1 wherein said indication is based on a fuel delivery rate to the engine being below a threshold.

9. The fuel supply system of claim 1 wherein said engine controller enables operation of said high pressure pump when a present operating condition of the engine is no longer within said first range.

10. The fuel supply system of claim 1 wherein said engine controller enables operation of said high pressure pump based on an indication of a present engine operating condition being in a second range.

11. The method of claim 1 wherein one normally-open solenoid valve is supplied for each said high pressure pump.

12. A method to control a fuel supply system for an internal combustion engine, said fuel supply system having a fuel tank with a low pressure pump disposed therein and a high pressure pump located downstream of the low pressure pump, the high pressure fuel pump supplying fuel to a fuel rail, the method comprising:

disabling said high pressure pump for at least one pump cycle while the engine is operating, said disablement being based on the level of at least one engine parameter wherein said disablement allows fluidic communication between the low pressure fuel pump and the fuel rail.

13. The method of claim 12 wherein said high pressure pump is a variable pressure pump and said parameter is pump pressure being demanded by an electronic control unit coupled to the high pressure pump, the high pressure pump being disabled when said demanded pump pressure is lower than a threshold pressure.

14. The method of claim 12 wherein said fuel supply system further includes fuel injectors disposed downstream of the fuel rail, a fuel delivery amount per engine combustion event is commanded by an electronic control unit coupled to said fuel injectors, said engine parameter is said commanded fuel delivery amount and said disablement occurs based on said commanded fuel delivery amount being lower than a threshold.

15. The method of claim 12 wherein said engine parameter is a fuelling rate supplied to the engine, said disablement is commanded when said fuelling rate is lower than a threshold.

16. The method of claim 12 wherein said engine parameter is engine speed, said disablement is commanded when engine torque is lower than a threshold torque.

17. The method of claim 16 wherein said indication is further based on engine coolant temperature being above a low temperature threshold.

18. The method of claim 12 wherein output of said low pressure pump is in the range of 3 to 7 bar.

19. The method of claim 12 wherein a solenoid valve is disposed between the low pressure pump and the high pressure pump and said disablement of the high pressure pump is accomplished by maintaining said solenoid valve in an open position.

20. A fuel supply system for an internal combustion engine, comprising:

a fuel tank;

a low pressure pump disposed in said fuel tank;

a high pressure pump located downstream of said low pressure pump, said high pressure pump having a cylinder with a plunger disposed therein, said cylinder having an outlet port and an inlet port controlled by a normally-open solenoid valve;

a fuel rail disposed downstream of said high pressure pump; and an engine controller coupled to said solenoid valve, said electronic control unit disabling operation of said solenoid valve during at least two plunger strokes based on an indication of a present engine operating condition being in a first range wherein when said solenoid valve is open, fluidic communication between an output of said low pressure pump and said fuel rail is maintained.

21. The fuel supply system of claim 20 wherein said engine operating condition comprises at least one of: engine speed, engine torque, fuel delivery rate, and engine temperature.

22. The fuel supply system of claim 20 wherein said electronic control unit enables operation of said solenoid valve when said operating condition is no long within said first range.

23. A method to control a fuel supply system for an internal combustion engine, said fuel supply system having a fuel tank with a low pressure pump disposed therein and a high pressure pump located downstream of the low pressure pump, the method comprising:

actuating a normally-open solenoid valve located in an inlet port of each high pressure pump once per pump plunger stroke in response to a first set of engine operating conditions; and maintaining said normally-open solenoid valve in an open position for at least two pump plunger strokes in response to a second set of engine operating conditions.

24. The method of claim 23 wherein said first set of engine operating conditions comprises an engine speed above a threshold engine rpm and said second set of engine operating conditions comprises an engine speed below said threshold.

25. The method of claim 23 wherein said first set of engine operating conditions comprises an engine temperature being below a threshold temperature and said second set of engine operating conditions comprise and engine speed being below a threshold speed and said engine temperature being above a threshold temperature.

26. The method of claim 23 where said high pressure pump is coupled to fuel injectors disposed in engine cylinders via a fuel rail and said first set of engine operating conditions comprises a fuel mass injected per injection being greater than a threshold quantity and said second set of engine operating conditions comprises said fuel mass injected per injection being less than said threshold quantity.

27. The method of claim 23 wherein an output pressure of the low pressure pump is in the range of 3 to 7 bar and an output of said high pressure pump when maintaining said solenoid valve in its open position.

28. The method of claim 23 wherein the internal combustion engine has one high pressure pump and one normally-open solenoid valve.

29. The method of claim 23 wherein the internal combustion engine has two high pressure pumps and two normally-open solenoid valves.

* * * * *